(12) United States Patent
Harrison

(10) Patent No.: US 6,920,958 B2
(45) Date of Patent: Jul. 26, 2005

(54) ANNULAR ACOUSTIC PANEL

(75) Inventor: Geoffrey E. Harrison, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/688,378

(22) Filed: Oct. 17, 2003

(65) Prior Publication Data

US 2005/0082112 A1 Apr. 21, 2005

(51) Int. Cl.⁷ .......................... B64D 33/02; G10K 11/16
(52) U.S. Cl. ...................... 181/214; 181/213; 181/210; 244/53 B
(58) Field of Search .................................. 181/214, 213, 181/210, 205, 203; 244/1 N, 53 B; 415/119

(56) References Cited

U.S. PATENT DOCUMENTS

| | | | | |
|---|---|---|---|---|
| 3,477,231 A | * | 11/1969 | Paulson ..................... | 181/214 |
| 3,964,568 A | | 6/1976 | Neumann ............... | 181/33 HA |
| 4,235,303 A | * | 11/1980 | Dhoore et al. ............... | 181/214 |
| 4,484,856 A | * | 11/1984 | Patacca ..................... | 181/214 |
| 4,732,532 A | * | 3/1988 | Schwaller et al. .......... | 415/119 |
| 4,759,513 A | * | 7/1988 | Birbragher ................. | 244/1 N |
| 5,025,888 A | * | 6/1991 | Arcas et al. ................ | 181/213 |
| 5,167,118 A | * | 12/1992 | Torkelson ................... | 181/213 |
| 5,169,288 A | * | 12/1992 | Gliebe et al. ............... | 415/119 |
| 5,259,724 A | * | 11/1993 | Liston et al. ............... | 415/119 |
| 5,478,199 A | * | 12/1995 | Gliebe ........................ | 415/119 |
| 6,360,989 B1 | * | 3/2002 | Maguire .................... | 244/53 B |
| 6,505,706 B2 | | 1/2003 | Tse ............................ | 181/213 |
| 6,761,245 B2 | * | 7/2004 | Porte ......................... | 181/210 |
| 2004/0094359 A1 | * | 5/2004 | Porte et al. ................. | 181/214 |

FOREIGN PATENT DOCUMENTS

| | | | | | |
|---|---|---|---|---|---|
| GB | 2001391 A | * | 1/1979 | ............. | F02C/7/04 |
| GB | 2273131 A | * | 6/1994 | ........... | F02C/7/045 |

* cited by examiner

Primary Examiner—Edgardo San Martin
(74) Attorney, Agent, or Firm—Harness Dickey & Pierce P.L.C.

(57) ABSTRACT

An aircraft engine assembly is provided that is adapted to reduce noise produced by an engine included in the engine assembly. The engine assembly includes a nacelle having an inlet section and a main section that is houses the engine and fan assembly associated with the engine. The inlet section is coupled to the main section at a main bulkhead junction between the inlet section and the main section. A one piece annular acoustic panel is located within a recess in an internal wall of the nacelle. The annular acoustic panel extends from a forward portion of the inlet section to a forward portion of the main section such that the bulkhead is covered by the annular acoustic panel.

28 Claims, 3 Drawing Sheets

ANNULAR ACOUSTIC PANEL

FIELD OF INVENTION

The invention relates generally to inlet absorption and attenuation of aircraft engine noise. More specifically, the invention relates to a monolithic annular acoustic panel that extends interiorly from a front portion of an engine nacelle inlet, past a junction of the nacelle inlet and a nacelle engine structure, and into the engine structure.

BACKGROUND OF THE INVENTION

Airlines are required by law to meet certain regulatory engine noise standards for their aircraft. Generally, known aircraft engine acoustic treatment systems consist of a segmented series of individual panels attached inside an engine fan case. The panels are typically located immediately aft of an engine/inlet attachment interface and forward of an engine fan assembly. At least one known engine acoustic treatment system includes multiple individual panels installed side by side around an interior surface of the engine fan case and/or other adjacent interior areas of an engine nacelle. In such known acoustic treatment systems panel acoustically active area is typically not available around the edge bands of each individual panel or at fastener locations. Acoustic area is also lost between each panel, between the panels and nacelle inlet structure, and between the panels and the nacelle engine structure adjacent the face of fan blades included in the fan assembly. Additionally, the number of panels included in the typical acoustic treatment system makes it difficult to 'Tune' the acoustic treatment to best match the source noise. That is, it is difficult to match the acoustic absorption characteristics of the acoustic treatment to the noise signature of a specific engine and associated fan assembly. Furthermore, typical noise treatment systems have numerous leak paths that allow air, and thus noise, to escape from the engine assembly. Further yet, in known acoustic treatment systems the high number of parts adds weight to the aircraft and increases labor and parts costs.

Therefore, it would be desirable to have an improved aircraft engine acoustic treatment system that will reduce aircraft engine noise to alleviate its adverse impacts on the passengers as well as the airport's neighboring communities. It would also be desirable to have an acoustic treatment system that increases acoustic area, improves engine performance, reduces aircraft weight and reduces labor and parts costs associated with installing the acoustic treatment system.

BRIEF SUMMARY OF THE INVENTION

In a preferred embodiment of the present invention an aircraft engine assembly is provided that is adapted to reduce noise produced by an engine and/or fan assembly included in the engine assembly. The engine assembly includes a nacelle having an inlet section and a main section that houses the engine and fan assembly. The inlet section is coupled to the main section at a bulkhead junction between the inlet section and the main section. A one piece annular acoustic panel is located within a recess in an internal wall of the nacelle. The annular acoustic panel extends from a forward portion of the inlet section to a forward portion of the main section such that the bulkhead is covered by the annular acoustic panel. The annular acoustic panel absorbs inlet noise generated by the engine and/or fan assembly. Additionally, the annular acoustic panel can be acoustically tuned to match a noise signature of the specific engine and fan assembly, thereby increasing the noise absorption quality of the annular acoustic panel. Furthermore, the annular acoustic panel blocks the escape of noise from a forward portion of the nacelle and improves engine performance by substantially eliminating multiple leak paths within the section of the nacelle that extends forward of the fan assembly. Further yet, with respect to known acoustic treatment, the annular acoustic panel of the present invention increases the acoustic area and decreases the overall complexity.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

Figure 1:
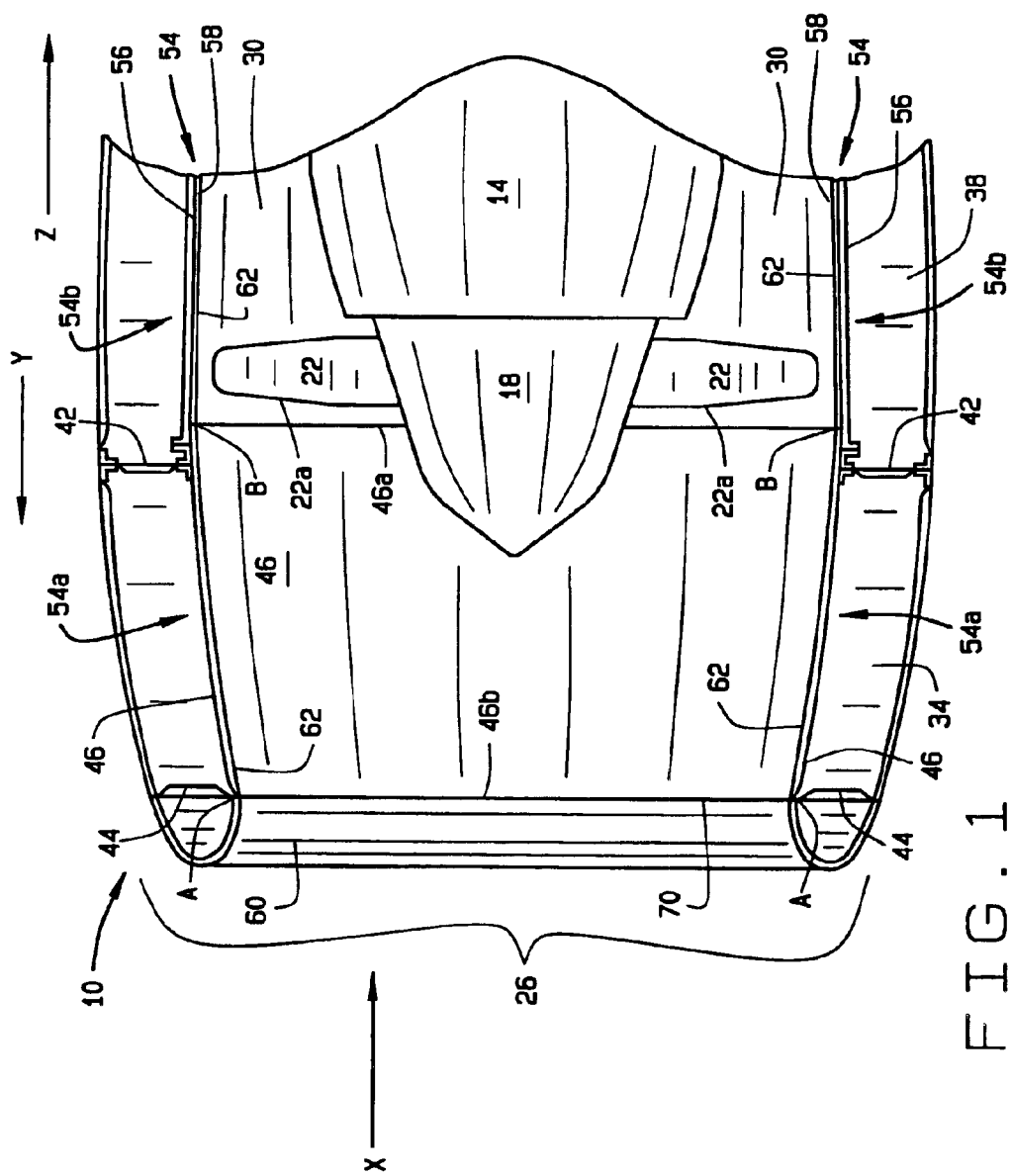
FIG. 1 is a longitudinal cross-sectional view of a portion of an aircraft engine assembly, in accordance with the present invention.

FIG. 1 is a longitudinal cross-sectional view of a portion of an aircraft engine assembly 10, in accordance with the present invention. The engine assembly includes an engine 14, for example, a gas turbine engine, and an associated fan assembly 18. The fan assembly 18 includes a plurality of circumferentially spaced fan blades 22. Surrounding the engine 14 and fan blades 22 is a nacelle 26 that is spaced radially outward from the engine 14 to define an annular duct 30. Air utilized by the engine assembly 10 to produce thrust enters the engine assembly in the direction X. Generally, air enters the nacelle 26, is then compressed by the fan blades 22 and allowed to bypass the engine 14 via the ducts 30.

The nacelle 26 includes an inlet section 34 coupled to a main section 38 that supports the engine 14 and fan assembly 18 within an interior area of the nacelle 26. The junction between the inlet and main sections 34 and 38 includes a main bulkhead 42 that is used to give structural integrity and strength to the nacelle 26 at the junction. The engine assembly 10 additionally includes a monolithic, i.e. one piece, annular acoustic panel 46 that absorbs inlet noise generated by the engine and/or fan assembly forward of the fan blades 22. It should be understood that the term 'forward', as used herein, means in the direction Y toward the front of the aircraft and the engine assembly, as opposed to aft, indicated as the direction Z toward the rear of the aircraft and engine assembly. The one piece annular acoustic panel 46 is a singular acoustic panel having a continuous annular form free from any break points, joints and gaps that extend through the thickness of the annular acoustic panel 46. Therefore, the annular acoustic panel 46 substantially prevents air from passing therethrough. Preventing air from passing through the annular acoustic panel 46 significantly reduces the amount of inlet noise and engine air that escapes through the nacelle 26 to the environment outside the nacelle 26. The annular acoustic panel 46 is constructed of any suitable acoustic material, for example a composite material such as graphite epoxy (GREP) or an aluminum bonded assembly.

The annular acoustic panel 46 is integrated within an internal wall 54 of the nacelle. More specifically, the annular acoustic panel 46 forms a segment of the internal wall 54 of the nacelle 26. The internal wall 54 includes an Inlet section 54a extending forward of the main bulkhead 42 to an inlet bulkhead 44. The internal wall 54 further includes a main section 54b extending aft from the main bulkhead 42. The inlet section 54a includes a forward portion of the annular acoustic panel 46 that extends forward from the main bulkhead 42. A forward segment of the main section 54b includes an aft portion of the annular acoustic panel 46 extending from the main bulkhead 42 to an aft edge 46a of the annular acoustic panel 46 and a forward portion of an engine case and fan blade containment structure 56. An aft segment of the main. section 54b includes an engine fan case acoustic liner 58 and an aft portion of the engine case and fan blade containment structure 56.

The annular acoustic panel 46 extends aft from a point in the inlet section 34 to a point in the forward portion of the main section 38. For example, the annular acoustic panel extends aft from a point A in the inlet section 34, to a point B in a forward portion of the main section 38. In one preferred embodiment, point A is located near a forward lip 60 of the inlet section 34 and point B is located between a point in the main section 38 adjacent a face 22a of the fan blades 22 and the main bulkhead 42. In another preferred embodiment, point A is located at the inlet bulkhead 44. Alternatively, point A could be located at any point in the nacelle inlet section 34.

In a preferred embodiment, the annular acoustic panel 46 is coupled to the inlet bulkhead 44 and the main bulkhead 42 using a plurality of fasteners (not shown). The fastener can be any suitable fastener, such as bolts or screws. Preferably, the fasteners are integrally formed with, or recessed in, the annular acoustic panel 46, thereby avoiding the presence of fastener heads that protrude into the interior area of the engine assembly 10 or cause any blockage or loss of acoustically treated area. Protruding fastener heads can cause noise evoking disruptions in the air passing through the engine assembly 10. The engine case and fan blade containment structure 56 is also coupled to the main bulkhead 42 using similar fasteners. The annular acoustic panel 46 extends aft beyond the main bulkhead 42, which forms the junction between the nacelle inlet section 34 and the nacelle main section 38. The aft edge 46a abuts and tightly mates with a forward end of the engine fan case acoustic liner 58. In a preferred embodiment, the aft edge 46a has a substantially air tight mating with the forward end of the engine fan case acoustic liner 58. In an alternate embodiment, the internal wall main section 54b includes an engine fan wear strip (not shown) located between the annular acoustic panel 46 and the engine fan case acoustic liner 58. In this embodiment, the aft edge 46a abuts and mates tightly, preferably substantially air tightly, with a forward end of the engine fan wear strip.

The annular acoustic panel 46 couples with the inlet bulkhead 44 such that an interior surface 62 of the nacelle interior wall 54 is substantially smooth and free from discontinuities at a forward edge 46b of the annular acoustic panel 46. Additionally, the annular acoustic panel 46 mates with the engine fan case acoustic liner 58 such that the interior surface 62 is substantially smooth and free from discontinuities at the aft edge 46a of the annular acoustic panel 46. More specifically, the junction where the annular acoustic panel aft edge 46a mates with the forward end of the engine fan case acoustic liner 58, or alternatively the forward end of the engine fan wear strip, forms a substantially smooth and continuous interior surface 62. Likewise, the junction where the annular acoustic panel mates tightly, preferably air tightly, with the forward lip 60 forms a substantially smooth and continuous interior surface 62. Therefore, the interior surface 62 forward of the fan blades 22 is substantially aerodynamically clean and substantially free from discontinuities. This substantially aerodynamically clean portion of the interior surface 62 reduces excrescence drag within the engine assembly and thus, reduces noise generated by air passing through the forward portion of the nacelle 26.

Figure 2:
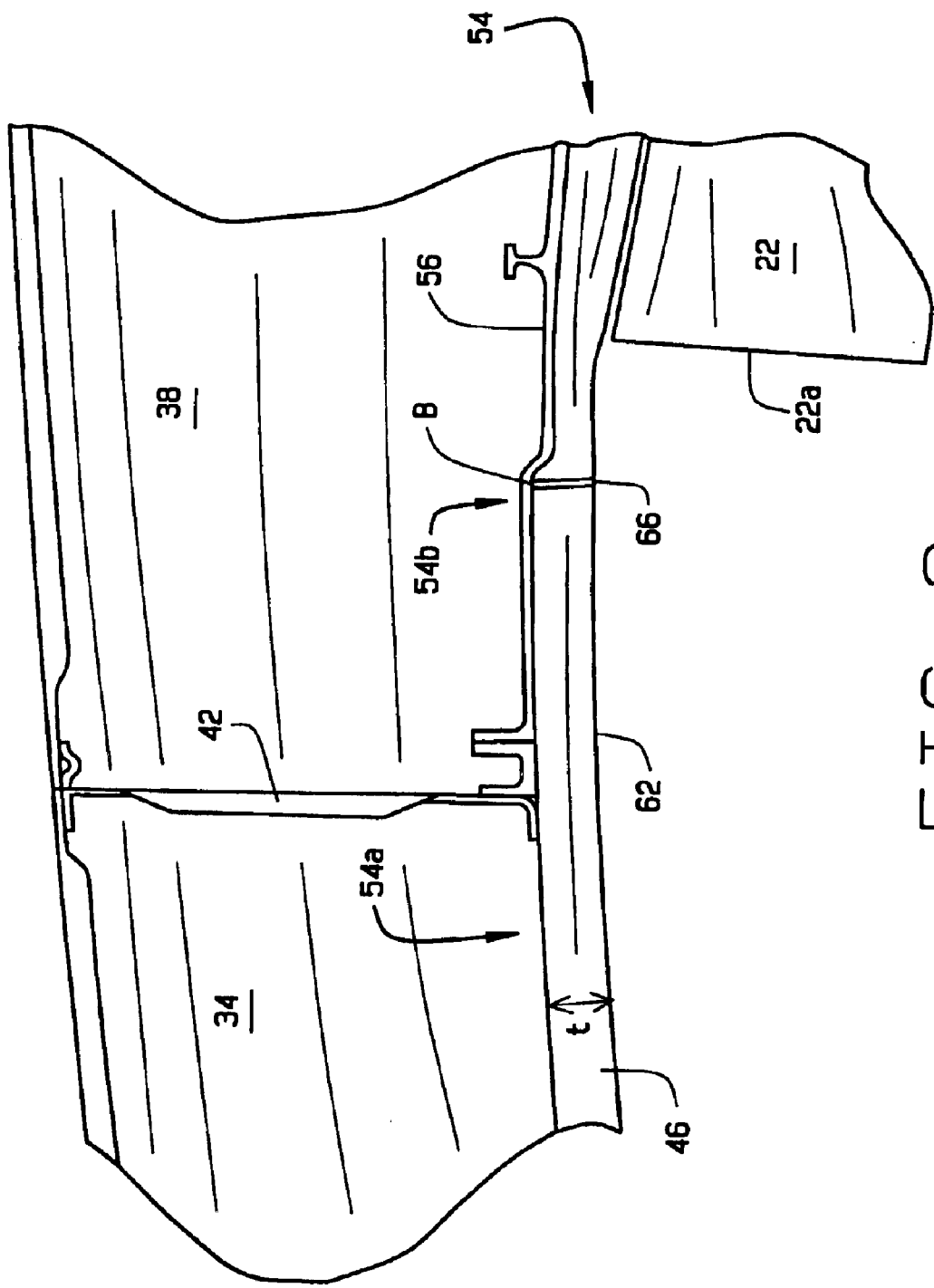
FIG. 2 is an exploded view of a section of the engine assembly illustrating a preferred embodiment of an annular acoustic panel shown in FIG. 1.

Referring to FIG. 2, as described above, the annular acoustic panel 46 extends from a point in the inlet section 34 to a forward portion of the main section 38 such that the main bulkhead 42 is covered by the annular acoustic panel 46. In a preferred embodiment, the annular acoustic panel 46 extends from point in the forward portion of the inlet section 34 to a point in the forward portion of the main section 38 that is forward of the fan blade face 22a. That is, the annular acoustic panel 46 extends from a point in the forward portion of the inlet section 34, such as point A (shown in FIG. 1), to a point in the main section 38 between the main bulkhead 42 and the fan face 22a, such as point B.

Figure 3:
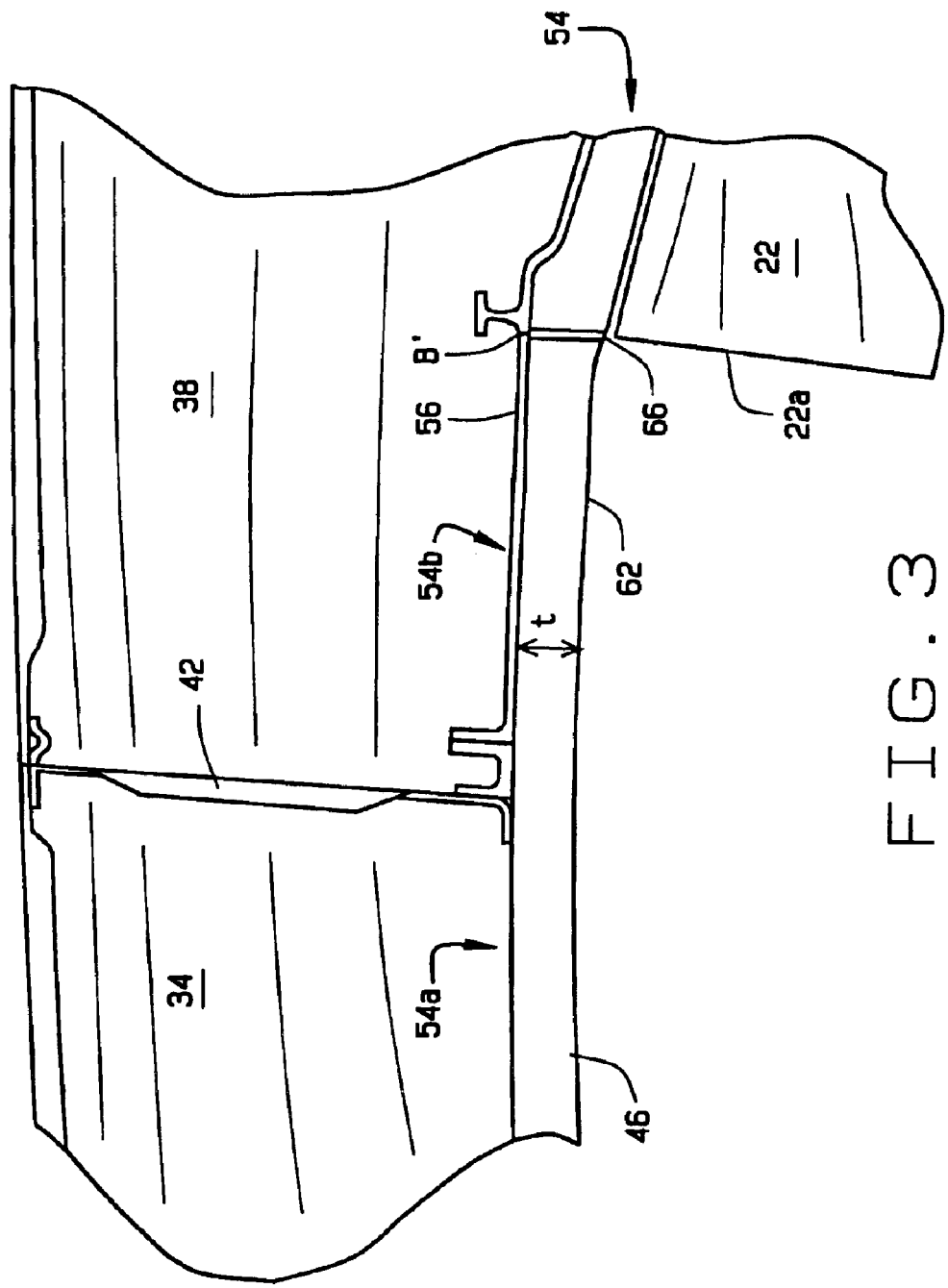
FIG. 3 is an exploded view of a section of the engine assembly illustrating another preferred embodiment of an annular acoustic panel shown in FIG. 1.

Referring now to FIG. 3, in another preferred embodiment, the annular acoustic panel 46 extends from the forward portion of the inlet section 34 to a point in the forward portion of the main section 38 that is adjacent and substantially even with the fan blade faces 22a. That is, the annular acoustic panel 46 extends from a point in the forward portion of the inlet section 34, such as point A (shown in FIG. 1), to a point in the main section 38 that is adjacent and substantially even with the fan blade face 22a, such as point B'.

Referring again to FIG. 2, covering the main bulkhead 42 combined with the substantially air tight fit of the annular acoustic panel 46 with the forward lip 60 and the engine fan case acoustic liner 58 substantially eliminates multiple leak paths in the portion of the interior surface 62 forward of the fan assembly 18. That is, the leak path through the main bulkhead 42 and the leak paths at the forward and aft edges 46b and 46a are substantially eliminated. This is because the annular acoustic panel 46 is a one piece acoustic panel that covers the main bulkhead 42 and has a substantially air tight fit with the forward lip 60 and the acoustic liner 58. Therefore, air and noise which escape though such leak paths to the environment outside of the engine assembly 10 are substantially eliminated.

In a preferred embodiment, to further ensure an air tight fit with the engine fan case acoustic liner 58, an aft seal 66 is included between the aft edge 46a and the engine fan case acoustic liner 58. Alternatively, the aft seal 66 is included between the aft edge 46a and the engine fan wear strip. The aft seal 66 forms an effectively air tight seal around the aft edge 46a of the annular acoustic panel 46. Similarly, a forward seal 70 (shown in FIG. 1) is included between the forward edge 46b and the forward lip 60, thereby forming an effectively air tight seal around the forward edge 46b of the annular acoustic panel 46. The seals 66 and 70 can be constructed of any suitable seal material such as rubber or silicone. In an alternative preferred embodiment, caulk is used to form an effectively air tight seal between the annular acoustic panel 46 and the engine fan case acoustic liner 58 and the forward lip 60.

The fan case and fan blade containment structure 56 is adapted to contain various kinds of engine failures. For example, if an engine part fails or breaks and flies off, the flying engine debris is contained within the nacelle 26 and not allowed to strike and damage other parts of the aircraft. In a preferred embodiment, the annular acoustic panel 46 is integrated within the internal wall 54 of the nacelle 26 such that the functionality, effectiveness and integrity of the fan case and fan blade containment structure 56 is maintained and not compromised.

Constructing the annular acoustic panel 46 to be a monolithic, i.e. one piece, panel enables the annular acoustic panel 46 to be tunable to match a noise signature of the engine and/or the fan assembly. That is, the annular acoustic panel 46 can be configured to match the noise signature, i.e. the noise wavelength, amplitude and pattern of the engine and/or the fan assembly. Matching the noise signature attenuates or substantially eliminates noise having the specific wavelength, amplitude and pattern. This more effectively reduces the amount of noise generated by the engine and the fan assembly that is audible to the environment external to the engine assembly 10. For example, matching the noise signature reduces the engine noise audible to communities neighboring an airport. Tuning the annular acoustic panel 46 can be done in any suitable manner known in the art of acoustical dampening. For example, the annular acoustic panel 46 can be tuned to match the noise signature of the engine and/or the fan assembly by adjusting a face sheet open area, i.e. increasing or decreasing the area of an inner surface of the annular acoustic panel 46. Alternatively, the annular acoustic panel 46 can be tuned by adjusting the depth, pattern and number of acoustical perforations (not shown) in the annular acoustic panel 46. Further yet, the annular acoustic panel 46 can be tuned by adjusting the configuration of a septum (not shown), that may be included in the annular acoustic panel 46, to match the noise signature of the engine and/or the fan assembly. Still further, the annular acoustic panel 46 can be tuned by adjusting a core depth, i.e. a thickness t, of the annular acoustic panel 46.

The engine assembly 10 of the present invention employs the monolithic annular acoustic panel 46 to increase inlet noise attenuation for aircraft engines. The annular acoustic panel 46 is a one piece acoustic panel that extends from the inlet section 34, past the main bulkhead 42 and into the main section 38. Extending the annular acoustic panel 46 past the main bulkhead 42 and into the main section 38 substantially eliminates multiple leak paths through which noise can pass. Additionally, the annular panel 46 is integrated within the internal wall 62 having a substantially air tight seal that further eliminates leak paths. Furthermore, the monolithic design of the annular acoustic panel 46 provides significantly more acoustic area that can tuned to match the noise signature of specific engines 14 and/or fan assemblies 18. Further advantages of the monolithic annular acoustic panel 46 of the present invention are decreased complexity of engine inlet acoustic treatment, decreased acoustic treatment weight, maintained integrity and functionality of the engine case and fan blade containment structure 56, reduced excrescence drag and reduce parts and labor costs.

While the invention has been described in terms of various specific embodiments, those skilled in the art will recognize that the invention can be practiced with modification within the spirit and scope of the claims.

What is claimed is:

1. An aircraft engine assembly adapted to attenuate noise, said engine assembly comprising:
    a nacelle including an inlet section coupled to a main section adapted to support an engine and fan assembly therewithin; and
    a one piece annular acoustic panel that forms a segment of an internal wall of the nacelle, wherein the annular acoustic panel forms at least a portion of the inlet section and a forward portion of the main section.

2. The engine assembly of claim 1, wherein the annular acoustic panel extends from a forward portion of the inlet section to a forward portion of the main section such that a junction between the inlet portion and the main portion is covered by the annular acoustic panel.

3. The engine assembly of claim 2, wherein the annular acoustic panel extends from the forward portion of the inlet section to a point in the forward portion of the main section that is forward of a face of a fan included in the fan assembly.

4. The engine assembly of claim 2, wherein the annular acoustic panel extends from the forward portion of the inlet section to a point in the forward portion of the main section that is even with a face of a fan included in the fan assembly.

5. The engine assembly of claim 1, wherein the annular acoustic panel is integrated within the internal wall of the nacelle such that an aerodynamically clean interior surface of a portion of the nacelle forward of the fan assembly is formed that is free from discontinuities, thereby reducing excrescence drag within the engine assembly.

6. The engine assembly of claim 1, wherein the annular acoustic panel is integrated within the internal wall of the nacelle such that multiple leak paths are substantially eliminated.

7. The engine assembly of claim 1, wherein the annular acoustic panel is integrated with in the internal wall of the nacelle such that functionality of a fan blade containment structure included in the main portion of the nacelle is maintained.

8. The engine assembly of claim 1, wherein the engine assembly further includes an aft seal between an aft edge of the annular acoustic panel and one of a engine fan acoustic liner and a engine fan wear strip, thereby forming an air tight seal around the aft edge of the annular acoustic panel.

9. The engine assembly of claim 8, wherein the engine assembly further includes a forward seal between a forward edge of the annular acoustic panel and an aft edge of a lip of the inlet section, thereby forming an air tight seal around the forward edge of the annular acoustic panel.

10. The engine assembly of claim 1, wherein the annular acoustic panel is adapted to be tunable to match a noise signature of at least one of the engine and the fan assembly.

11. A method for attenuating noise produced by an aircraft engine assembly, said method comprising:
    absorbing noise produced by at least one of an engine and a fan assembly included in the engine assembly utilizing a monolithic annular acoustic panel integrated within an internal wall of an engine assembly nacelle to include at least a portion of an inlet section and a forward portion of a main section of the nacelle; and
    substantially eliminating multiple leak paths within a portion of the nacelle forward of the fan assembly, utilizing the monolithic annular acoustic panel.

12. The method of claim 11, wherein absorbing noise utilizing the annular acoustic panel comprises integrating the annular acoustic panel within the internal wall such that the annular acoustic panel extends from a forward portion of an inlet section of the nacelle to a forward portion of a main section of the nacelle.

13. The method of claim 12, wherein integrating the annular acoustic panel within the internal wall comprises integrating the annular acoustic panel within the internal wall such that the annular acoustic panel extends from the forward portion of the inlet section to a point in the forward portion of the main section that is forward of a face of a fan included in the fan assembly.

14. The method of claim 12, wherein integrating the annular acoustic panel within the internal wall comprises integrating the annular acoustic panel within the internal such that the annular acoustic panel extends from the forward portion of the inlet section to a point in the forward portion of the main section that is even with a face of a fan included in the fan assembly.

15. The method of claim 11, wherein substantially eliminating multiple leak paths within a portion of the nacelle forward of the fan assembly comprises integrating the annular acoustic panel within the internal wall such that a main bulkhead between the inlet portion and the main portion is covered by the annular acoustic panel.

16. The method of claim 11, wherein absorbing noise utilizing the annular acoustic panel comprises integrating the annular acoustic panel within the internal wall of the nacelle such that an aerodynamically clean interior surface of the portion of the nacelle forward of the fan assembly is formed that is free from discontinuities, thereby reducing excrescence drag within the engine assembly.

17. The method of claim 11, wherein substantially eliminating multiple leak paths within a portion of the nacelle forward of the fan assembly comprises forming an air tight seal around an aft edge of the annular acoustic panel utilizing an aft seal located between the aft edge of the annular acoustic panel and a forward edge of one of a engine fan case acoustic liner and an engine fan wear strip.

18. The method of claim 11, wherein substantially eliminating multiple leak paths within a portion of the nacelle forward of the fan assembly further comprises forming an air tight seal around a forward edge of the annular acoustic panel utilizing a forward seal located between the forward edge of the annular acoustic panel and an aft edge of a lip of the inlet section.

19. The method of claim 11, wherein absorbing noise utilizing the annular acoustic panel comprises tuning the annular acoustic panel to match a noise signature of at least one of the engine and the fan assembly.

20. An aircraft adapted to reduce engine noise, said aircraft comprising:
an engine assembly, wherein said engine assembly comprises:
a nacelle including an inlet section coupled at a main bulkhead to a main section adapted to support an engine and fan assembly therewithin; and
a one piece annular acoustic panel integrated within an internal wall of the nacelle, whereby the annular acoustic panel extends from a forward portion of the inlet section to a forward portion of the main section such that the main bulkhead is covered by the annular acoustic panel.

21. The engine assembly of claim 20, wherein the annular acoustic panel is integrated within the internal wall of the nacelle such that an aerodynamically clean interior surface of a portion of the nacelle forward of the fan assembly is formed that is free from discontinuities, thereby reducing excrescence drag within the engine assembly.

22. The engine assembly of claim 20, wherein the annular acoustic panel is integrated with in the internal wall of the nacelle such that multiple leak paths are substantially eliminated.

23. The engine assembly of claim 20, wherein the annular acoustic panel is integrated with in the internal wall of the nacelle such that the integrity of a fan blade containment structure included in the main portion of the nacelle is maintained.

24. The engine assembly of claim 20, wherein the engine assembly further includes an aft seal between an aft edge of the annular acoustic panel and an aft edge of one an engine fan case acoustic liner and an engine fan wear strip, thereby forming an air tight seal around the aft edge of the annular acoustic panel.

25. The engine assembly of claim 24, wherein the engine assembly further includes a forward seal between a forward edge of the annular acoustic panel and an aft edge of a lip of the inlet section, thereby forming an air tight seal around the forward edge of the annular acoustic panel.

26. The engine assembly of claim 20, wherein the annular acoustic panel extends from the forward portion of the inlet section to a point in the forward portion of the main section that is forward of a face of a fan included in the fan assembly.

27. The engine assembly of claim 20, wherein the annular acoustic panel extends from the forward portion of the inlet section to a point in the forward portion of the main section that is even with a face of a fan included in the fan assembly.

28. The engine assembly of claim 20, wherein the annular acoustic panel is adapted to be tunable to match a noise signature of at least one of the engine and the fan assembly.

* * * * *